(12) United States Patent
Huang

(10) Patent No.: US 6,334,380 B1
(45) Date of Patent: Jan. 1, 2002

(54) CLAMPING DEVICE OF CIRCULAR SAW

(75) Inventor: Peter Huang, Taichung (TW)

(73) Assignee: Duro Machinery Corp., Taichung (TW)

( * ) Notice: Subject to any disclaimer, the term of this patent is extended or adjusted under 35 U.S.C. 154(b) by 0 days.

(21) Appl. No.: 09/489,852

(22) Filed: Jan. 24, 2000

(51) Int. Cl.⁷ .................................................. B26D 7/01
(52) U.S. Cl. ....................... 83/471.2; 83/471.3; 83/453; 83/466; 83/468.3
(58) Field of Search ........................... 83/475, 453, 456, 83/466, 468.3, 468.6, 471.3, 471.2

(56) References Cited

U.S. PATENT DOCUMENTS

| | | | | |
|---|---|---|---|---|
| 5,016,510 A | * | 5/1991 | Gardner ..................... | 83/471.2 |
| 5,109,742 A | * | 5/1992 | Strong ....................... | 83/468.7 |
| 5,161,443 A | * | 11/1992 | Huang ........................ | 83/490 |
| 5,297,463 A | * | 3/1994 | O'Banion et al. .......... | 83/471.3 |
| 5,483,858 A | * | 1/1996 | Chen .......................... | 83/468.3 |
| 5,720,096 A | * | 2/1998 | Dorsey ....................... | 83/468.3 |
| 5,755,148 A | * | 5/1998 | Stumpf et al. ............. | 83/468.2 |
| 5,845,555 A | * | 12/1998 | Dawley ...................... | 83/468.7 |

* cited by examiner

Primary Examiner—M. Rachuba
(74) Attorney, Agent, or Firm—Browdy and Neimark

(57) ABSTRACT

A circular saw comprises a workbench on which a cutting device and a work piece clamping device are mounted. The clamping device is formed of a stopping member and a clamping member. The stopping member can be adjusted in angle, whereas the clamping member can be adjusted in displacement and rotation. The stopping member is provided in a side wall thereof with a slide member slidable along the side wall in a constant track direction. The slide member has a rest portion which is adjustable in position such that the rest portion becomes an extension of the side wall of the stopping member, thereby resulting in an increase in the surface area of the side wall to enhance the effect of clamping the work piece.

5 Claims, 4 Drawing Sheets

CLAMPING DEVICE OF CIRCULAR SAW

FIELD OF THE INVENTION

The present invention relates generally to a circular saw, and more particularly to a clamping device of the circular saw.

BACKGROUND OF THE INVENTION

As shown in FIG. 1, a prior art circular saw has a work bench 1 on which a cutting device 2 and a clamping member are mounted. The cutting device 2 has a circular blade 2a driven by a motor. The clamping member is formed of a stopping piece 3 and a clamping piece 4. The stopping piece is fastened pivotally with the work bench 1 by a pivot 5. The stopping piece 3 is provided with an arcuate angle scale 3a to facilitate the cutting of a work piece at a predetermined angle. The clamping piece 4 is fastened pivotally with one end of a movable threaded rod 6.

In the process of cutting a work piece A at a desired angle, the stopping piece 3 is tilted, in cooperation with the angle scale 3a. The work piece A is then placed between the stopping piece 3 and the clamping piece 4 before the threaded rod 6 is advanced to drive the clamping piece 4 to press against the work piece A such that the clamping piece 4 swivels so as to urge the work piece A to tilt. The work piece A is then ready to be cut by the circular blade 2a. However, when the stopping piece 3 is swiveled on the pivot 5 for a greater angle, especially at the time when the stopping piece 3 is swiveled in a clockwise direction, one end of the stopping piece 3 is contiguous to the blade 2a and is moved away from the cutting position. As a result, when the clamping piece 4 holds the work piece A the clamping force F1 exerted via the threaded rod 6 is imparted to the work piece A and the stopping piece 3 from the clamping piece 4. In view of the stopping piece 3 having a limited area for resting the work piece A, the clamping force F1 exceeds the outermost side of the stopping piece 3 to form a couple of forces, thereby resulting in the work piece A being held insecurely. As a result, the quality of the work of cutting the work piece A by the blade 2a is seriously compromised.

SUMMARY OF THE INVENTION

The primary objective of the present invention is to provide a circular saw with a clamping device capable of holding securely a work piece.

In keeping with the principle of the present invention, the foregoing objective of the present invention is attained by a circular saw comprising a work bench, a cutting device, and a clamping device which is mounted on the work bench and is provided with a stopping member and a clamping member. The stopping member can be adjusted in angle, whereas the clamping member can be adjusted in displacement and rotation. The stopping member is provided in a side wall thereof with a slide member capable of sliding along the side wall in a constant track direction. The slide member has a rest portion which is adjustable in its position such that the rest portion becomes an extension of the side wall of the stopping member thereby resulting in an increase in the surface area of the side wall to enhance the effect of holding securely the work piece.

DETAILED DESCRIPTION OF THE INVENTION

Figure 1:
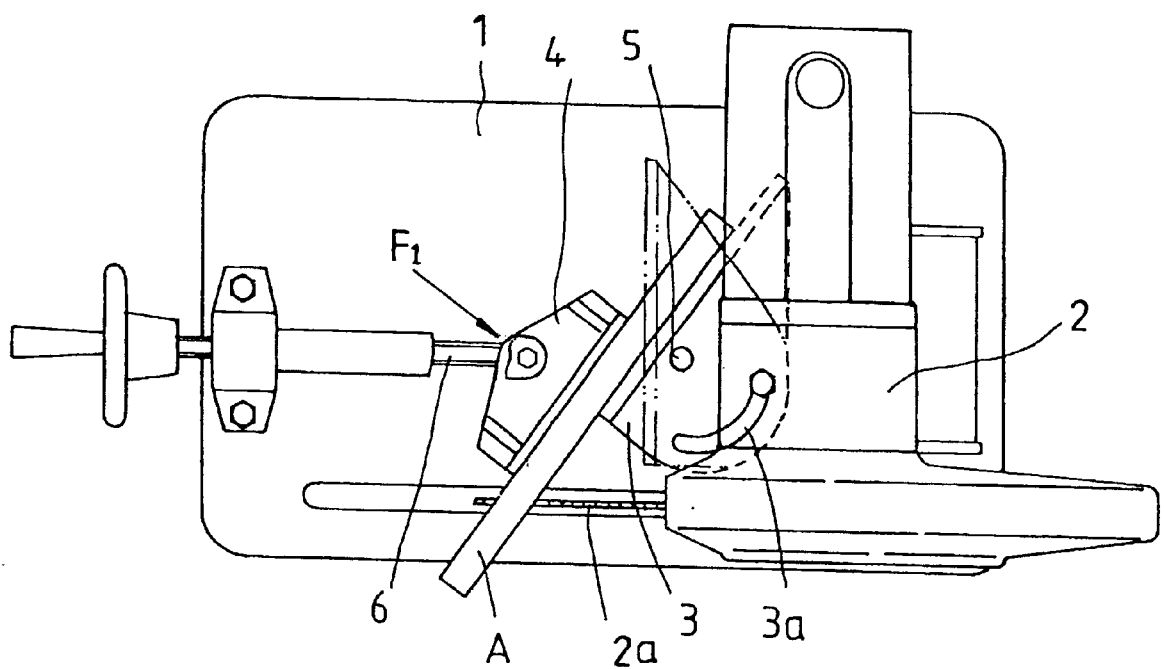
FIG. 1 shows a schematic view of a prior art circular saw in operation.
Figure 2:
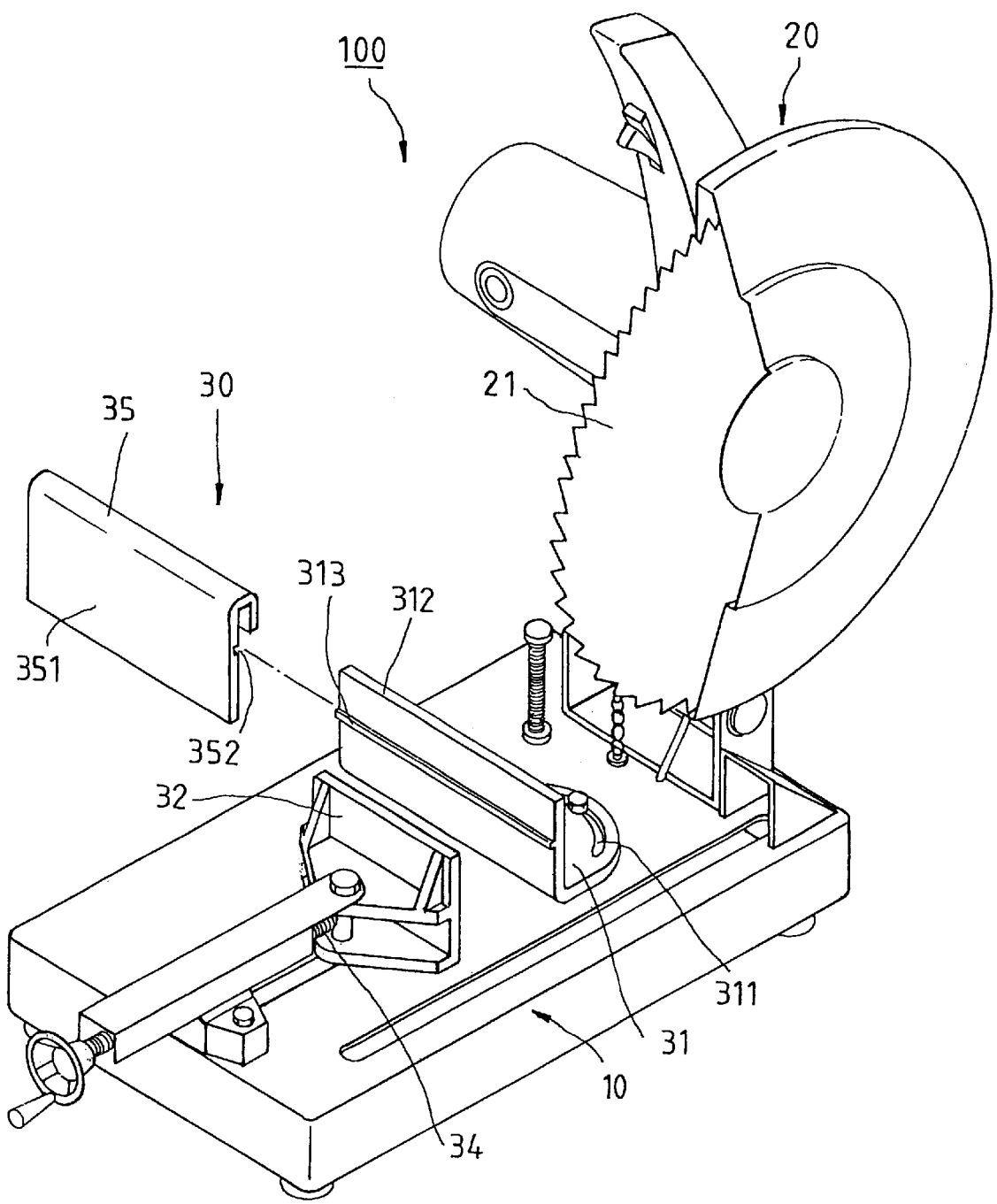
FIG. 2 shows a perspective view of a first preferred embodiment of the present invention.
Figure 3:
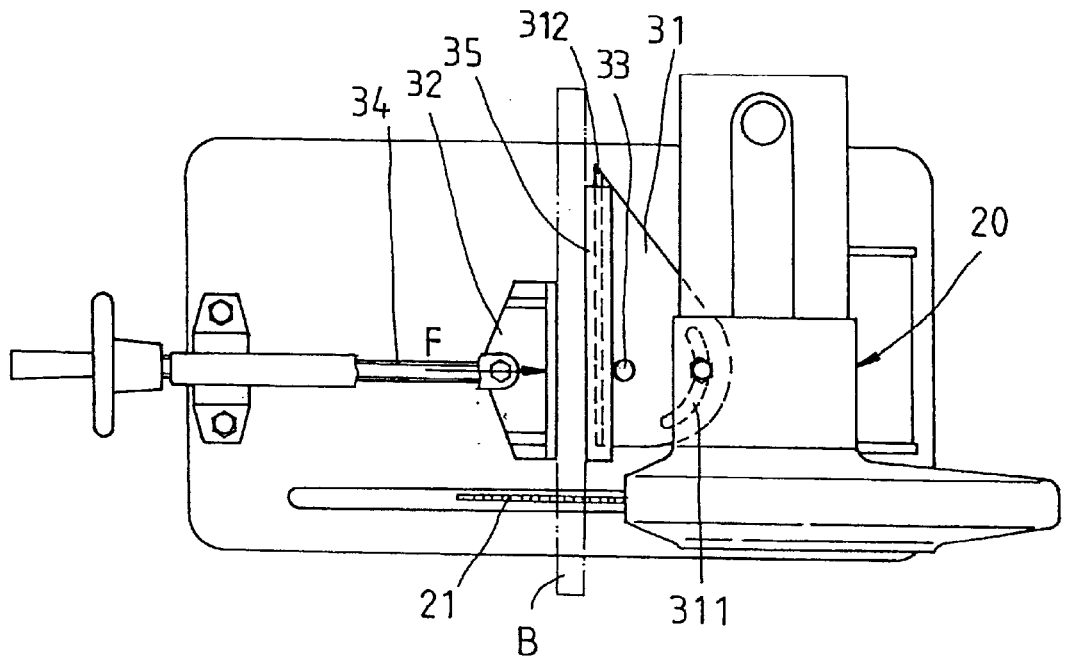
FIG. 3 shows a schematic view of the stopping member of the first preferred embodiment of the present invention in the state of pre-adjustment.

As shown in FIGS. 2 and 3, a circular saw 100 of the present invention comprises a work bench 10, a cutting device 20 mounted on the work bench 10, and a clamping device 30 mounted on the work bench 10. The cutting device 20 has a circular blade 21.

The clamping device 30 is formed of a stopping member 31 and a clamping member 32. The stopping member is fastened pivotally by a pivot 33 and is provided with an angle scale 311 to facilitate the adjusting of the angular position of the stopping member 31. The clamping member 32 is fastened pivotally with one end of a threaded rod 34 capable of a linear movement. The clamping member 32 is capable of displacing and swiveling along with the threaded rod 34.

The present invention is characterized by the stopping member 31 having a side wall 312 which is provided with a slide member 35 of an inverted U-shaped construction. The side wall 312 is provided with a rest portion 351 which has a bottom edge contiguous to the bench top of the work bench 10. The slide member 35 is secured to the side wall 312 of the stopping member 31. The side wall 312 is provided in the outer side thereof with a first glide portion 313 which is raised and arranged horizontally. The rest portion 351 of the slide member 35 is provided in the inner side thereof with a second guide portion 352 which is slotted and is corresponding in location to the first guide portion 313. The slide member 34 slides leftward and rightward along the side wall 312.

As illustrated in FIG. 3, the clamping member 32 is actuated by the threaded rod 34 to move forward to urge a work piece B to rest against the rest portion 351 of the slide member 35 such that the axial direction of the work piece is perpendicular to the cutting direction of the circular blade 21, and that the action force F of the threaded rod 34 acts on the work piece B via the clamping member 32, and further that the work piece B is stopped by the stopping member 31. The work piece B is thus securely held by the clamping device 30.

Figure 4:
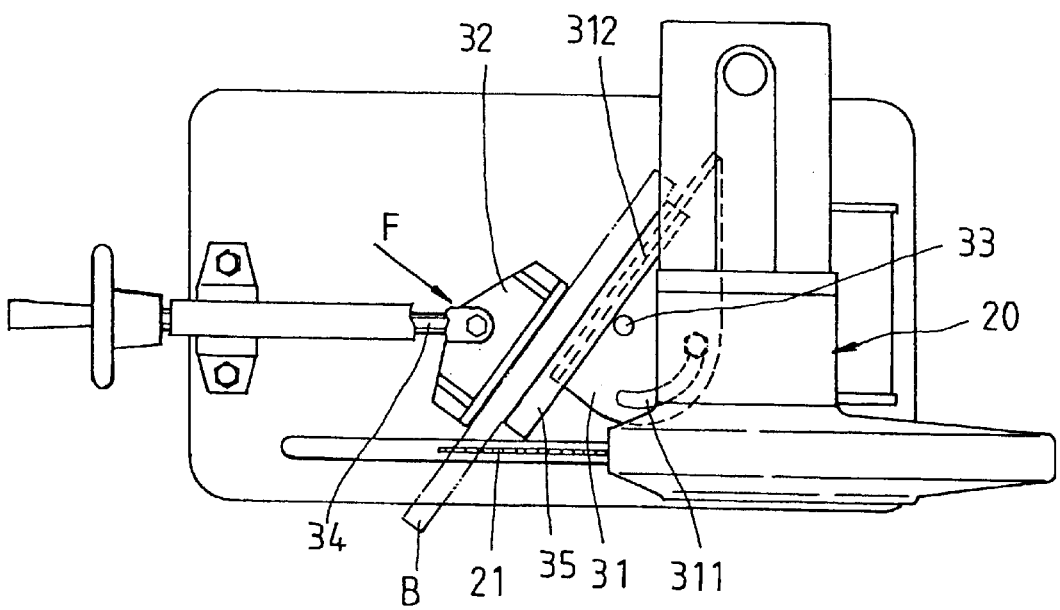
FIG. 4 shows a schematic view of the stopping member of the first preferred embodiment of the present invention in the state of post-adjustment.

As shown in FIG. 4, the work piece B is intended to be cut obliquely. According to a desired bevel, the stopping member 31 is so adjusted in conjunction with its angle scale 311 that the work piece B is ready to be cut in the desired bevel. In the course of the adjustment of the stopping member 31, the stopping member 31 swivels on the pivot 33 such that one end (contiguous to the blade 21) of the stopping member 31 moves away from the cutting position. In the meantime, the slide member 35 is pulled along the side wall 312 in the direction toward the circular blade 21, so as to enable the rest portion 351 of the slide member 35 to become an extension of the side wall 312, thereby enlarging the area against which the work piece B is pressed. As a result, the rest portion 351 of the slide member 35 is given an added area to bear the burden of the action force F of the threaded rod 34 such that the action force F is counteracted, and that the work piece B is thus prevented from being caused to turn by the action force F.

Figure 5:
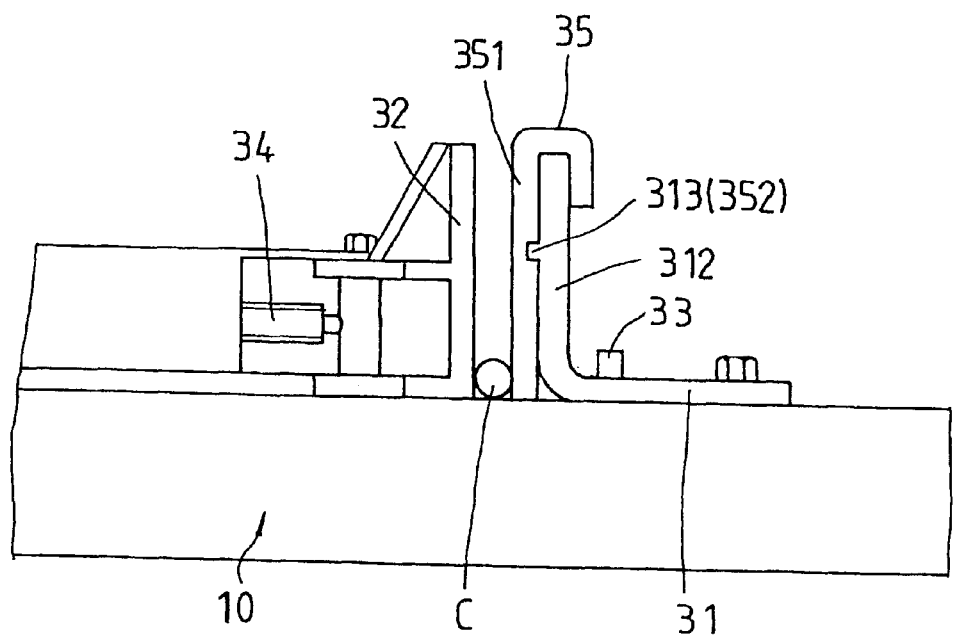
FIG. 5 shows a schematic view of the first preferred embodiment of the present invention in action.

As shown in FIG. 5, the slide member 35 is provided with a rest portion 351 to facilitate the holding of a work piece C having a relatively small diameter.

Figure 6:
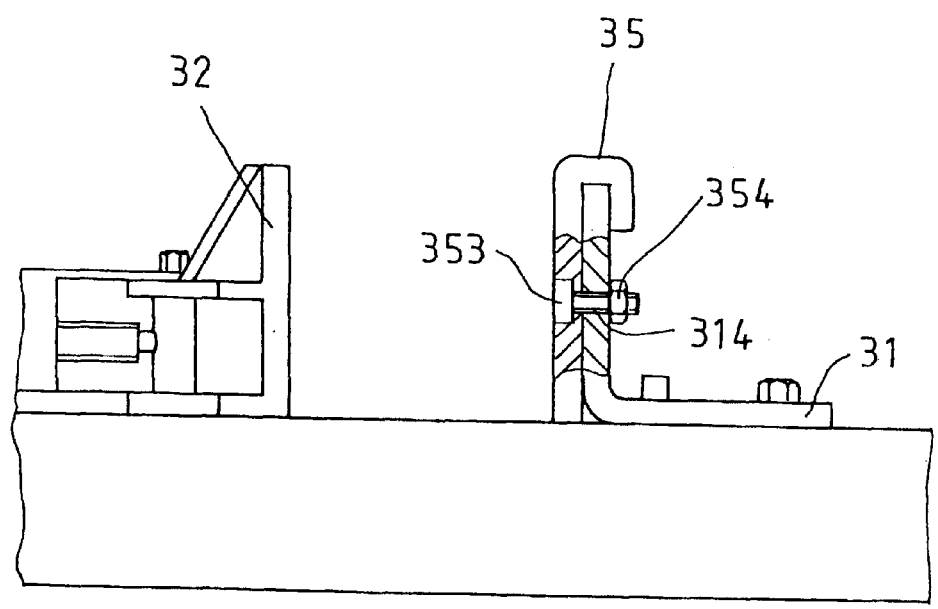
FIG. 6 shows a side sectional view of a second preferred embodiment of the preset invention.

As shown in FIG. 6, the second preferred embodiment of the present invention has a slide member 35, and a stopping member 31 which is joined with the slide member 35 and is provided with a slot 314 of a predetermined length. The slide member 35 is provided with a bolt 353 which is disposed in the slot 314 for fastening the slide member 35 at a position in conjunction with a nut 354.

The embodiments of the present invention described above are to be regarded in all respects as being merely illustrative and not restrictive. Accordingly, the present invention may be embodied in other specific forms without deviating from the spirit thereof. The present invention is therefore to be limited only by the scopes of the following appended claims.

What is claimed is:

1. A circular saw comprising:

a workbench;

a cutting device mounted on the workbench;

a clamping device mounted on the workbench for holding a workpiece to be cut by the cutting device;

wherein the clamping device is formed of a stopping member and a clamping member both rotatable relative to a longitudinal axis of the workbench;

the clamping member able to clamp the workpiece between the stopping member and the clamping member;

the stopping member having a side wall with a first guide portion along a longitudinal length of the side wall;

a slide member slidably engaged on the first guide portion of the side wall opposite the clamping member;

the slide member having an outer wall which adjusts with the slide member relative to the side wall along the longitudinal length of the side wall on the first guide member;

wherein the outer wall provides an extension of the side wall by adding an area to the side wall to engage the workpiece between the clamping member and the slide member.

2. The circular saw as defined in claim 1 wherein said slide member has an inverted U-shaped cross-section along a length thereof which is engaged on a top edge of said sidewall such that a bottom edge of the rest portion is contiguous to a bench top of the workbench.

3. The circular saw as defined in claim 1; wherein said slide member is provided with a second guide portion; and wherein said slide member slides along said side wall such that the second guide portion of said slide member moves along said first guide portion of said slide wall of said stopping member.

4. The circular saw as defined in claim 1, wherein said first guide portion of said side wall is a raised rail; and wherein said second guide portion of said slide member is a groove.

5. The circular saw as defined in claim 1, wherein said stopping member is provided with a slot of a length; and wherein said slide member is provided with a bolt whereby said bolt is disposed in said slot for fastening said slide member at a position in conjunction with a nut.

* * * * *